Figure 1:
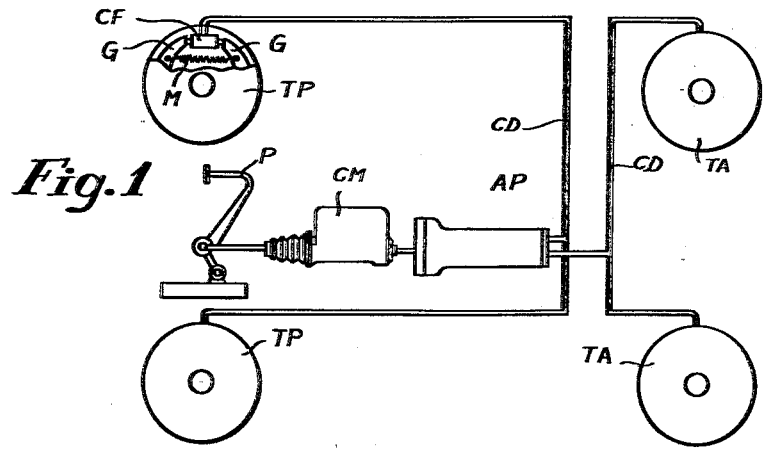

Nov. 7, 1961        P. S. BALDWIN        3,007,314
HYDRAULIC PRESSURE BOOSTER, MORE PARTICULARLY
FOR HYDRAULIC BRAKE SYSTEMS ON MOTOR VEHICLES
Filed June 26, 1959        2 Sheets-Sheet 1

Nov. 7, 1961   P. S. BALDWIN   3,007,314
HYDRAULIC PRESSURE BOOSTER, MORE PARTICULARLY
FOR HYDRAULIC BRAKE SYSTEMS ON MOTOR VEHICLES
Filed June 26, 1959   2 Sheets-Sheet 2
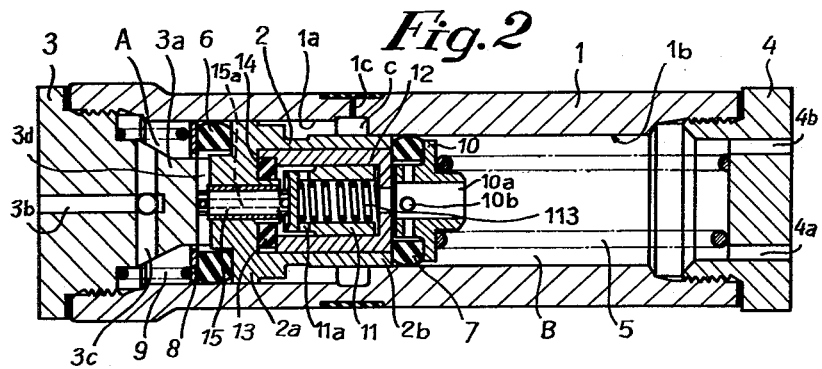
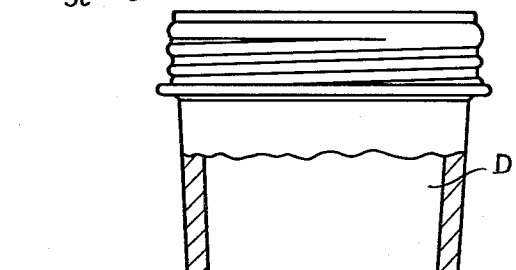
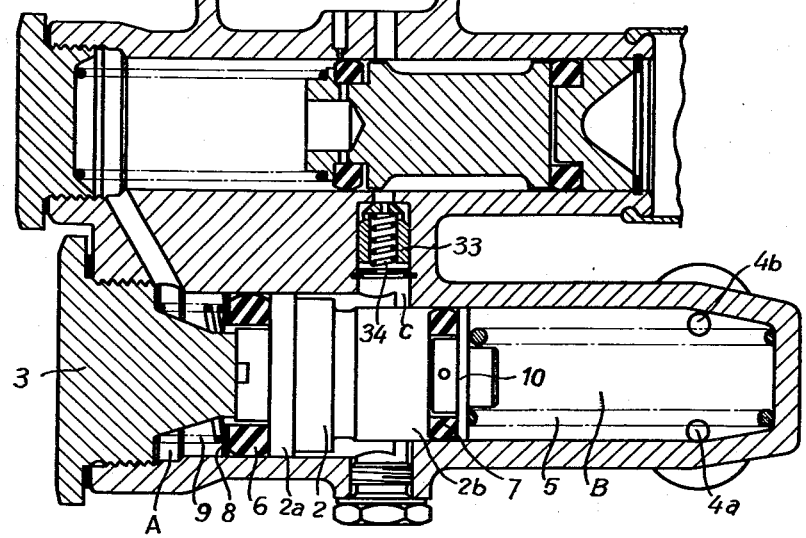

United States Patent Office 3,007,314
Patented Nov. 7, 1961

3,007,314
HYDRAULIC PRESSURE BOOSTER, MORE PARTICULARLY FOR HYDRAULIC BRAKE SYSTEMS ON MOTOR VEHICLES
Philip S. Baldwin, Florence, Italy, assignor of one-half to Fiat Societa per Azioni, Turin, Italy
Filed June 26, 1959, Ser. No. 823,152
Claims priority, application Italy Apr. 22, 1959
7 Claims. (Cl. 60—54.5)

This invention relates to a hydraulic pressure booster more particularly for hydraulic brake systems on motor vehicles. The invention relates more particularly to a hydraulic pressure booster adapted to be interposed between the outlet from the master cylinder and conduits connecting with the wheel brake cylinders on a motor vehicle, comprising a cylinder the inner hollow of which includes a large diameter and a small diameter portion, each portion connecting with each other at one end and being closed at its other end by one bottom wall of the cylinder, a compound piston, mounted for movement in the cylinder hollow, including a large and a small diameter portion, located in the large diameter and small diameter portions, respectively, of the inner cylinder hollow, a reaction spring constantly exerting on the compound piston an axial thrust in the direction of the opposite cylinder bottom, a stop adapted to prevent the large diameter piston portion from abutting the corresponding cylinder bottom under the reaction spring thrust, thereby contributing towards forming an intermediate low pressure chamber which is connected with the master cylinder, the space situated between the end of the small diameter portion of the compound piston and corresponding cylinder bottom forming a high pressure chamber which is connected with the conduits leading to the wheel brake cylinders, a through-conduit bored in the compound piston body, a valve interposed in said conduit to permit the continuous free liquid flow from the low pressure chamber to the high pressure chamber and intercept the flow in an opposite direction from a given pressure value in the high pressure chamber onwards and allow the said flow in a reverse direction upon fall in pressure, means for holding the valve open when the compound piston abuts the stop and closing it after displacement of the compound piston against the thrust of the reaction spring.

The main object of this invention is to provide a hydraulic pressure booster of the type referred to which affords a steady gradual increment in operating pressure acting in the wheel brake cylinders depending upon the delivery pressure transmitted by the master cylinder.

A further purpose of this invention is to provide a booster which affords an increment in operating pressure without an appreciable increase in the compound piston stroke in the case of a very rapid rise in the delivery pressure transmitted by the master cylinder.

A further purpose of this invention is to provide a booster by which the abovementioned purposes are obtained through constructional measures of a simple nature, whereby a booster is obtained which is easy and inexpensive to manufacture and extraordinarily reliable in working.

With the above purposes in view the pressure booster should be characterized by the fact that the reaction spring is mounted within the cylinder under an initial load such that it opposes without being compressed a thrust thereon by the compound piston under the action on the latter of a delivery pressure exceeding the delivery pressure required for approaching the brake blocks to the wheel brake drums, and of a stiffness such as to require an increment in the pressure acting on the compound piston by at least 1 kg./cm.$^2$ in order to compress it by 1 mm., before the valve controlling the liquid flow through the through-bore in the compound piston closes.

Figure 4:
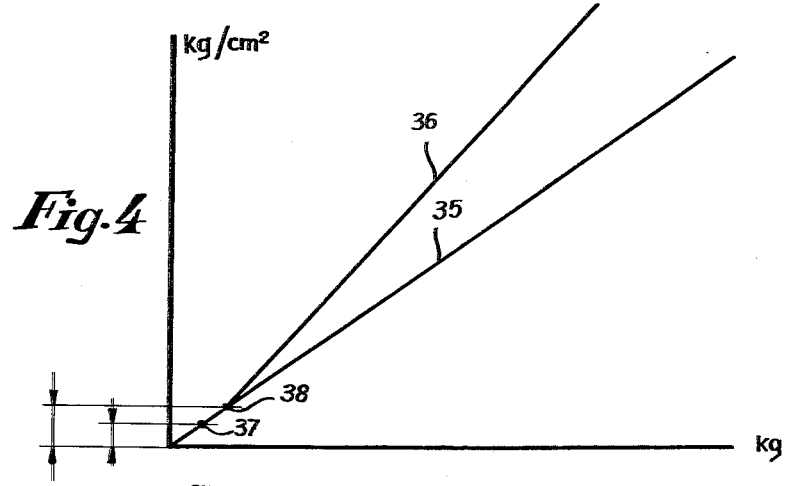
Figure 5:
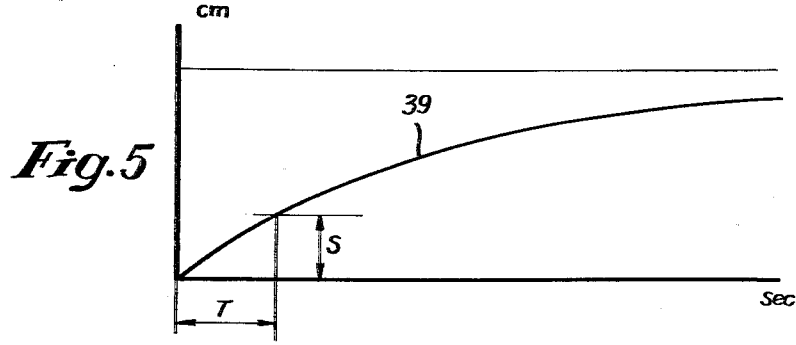

Further characteristic features and advantages of this invention will be clearly understood from the appended description referring to the accompanying drawings which show by way of a non-limiting example embodiments thereof. On the drawings:

FIGURE 1 shows the diagram of a hydraulic brake system on a motor vehicle equipped with the improved booster, FIGURE 2 is a longitudinal sectional view of the improved booster, FIGURE 3 is a longitudinal sectional view of a modification of the booster shown in FIGURE 2, FIGURE 4 shows a diagram relating to the variation in operating pressure obtainable through the device shown in FIGURE 2 depending upon the delivery pressure transmitted by the master cylinder, FIGURE 5 shows a diagram relating to the law of the compound piston displacement during the initial operating stage of the booster.

On the drawings the hydraulic brake system on a vehicle diagrammatically shown in FIGURE 1, comprises a master cylinder CM, the delivery pressure of which is varied by acting on the brake pedal P, and a plurality of conduits CD connecting with the wheel brake cylinders, one brake cylinder CF being shown by way of example at the left top of FIGURE 1. The wheel brake cylinders are carried within the brake drums. TP, TA denote the brake drums on the rear and front wheels, respectively. The brake wheel cylinders CF are interposed between the jaws G biassed by return springs M. The booster diagrammatically denoted by AP is interposed between the master cylinder CM and conduits CD. The booster shown in detail in FIGURE 2 of the drawings comprises a cylinder 1, the inner through-bore of which includes a large diameter portion 1a and a small diameter portion 1b, which interconnect and are closed to the outside by plugs 3, 4, respectively. A compound piston 2 is movable within the cylinder 1 and includes a large diameter portion 2a movably mounted in the large diameter portion 1a of the inner cylinder hollow, and a small diameter portion 2b movably mounted in the small diameter portion 1b of the cylinder. 5 denotes a reaction spring bearing on the plug 4 and extending on the compound piston 2 through the interposition of components to be described hereafter a thrust tending to move the piston towards the plug 3. 3a denotes a projection on the plug 3 which limits the stroke of the compound piston 2 under the action of the thrust by the reaction spring 5. The clearance between the plug 3 and large diameter portion 2a of the compound piston forms a low pressure chamber A connected with the outlet from the master cylinder by an axial conduit 3b and a plurality of radial conduits 3c bored in the plug 3. The space accommodating the reaction spring 5 forms a high pressure chamber D connecting with the conduits leading to the fore wheel brake cylinders by the through-bore 4a and with the rear wheel brake cylinders by the through-bore 4b, both bores 4a and 4b being bored in the plug 4.

The chambers A, B accommodate O-rings 6, 7, respectively, of resilient material such as rubber. The O-ring 6 is pressed against the compound piston portion 2a by the tension of spring 9 bearing on the plug 3 and acting on the O-ring 6 through the interposition of a washer 8. The O-ring 7 is held against the compound piston portion 2b by the reaction spring 5 acting on the O-ring through the interposition of a disc 10 of rigid material. The disc 10 has a through-axial bore 10a bored therethrough and tubular projections on each side, the tubular projection facing the compound piston portion 2b being smaller in axial size than the thickness of the O-ring 7, and having radial bores 10b bored therein to prevent the pressure in the chamber B from being transmitted to the inner periphery of the O-ring 7 improving sealing. Sealing is moreover afforded by selecting outer diameter of the projection on the disc 10 entering the inner hole in the O-ring 7 smaller than the bore of the latter hole.

In the example shown the compound piston has its hollow open towards the chamber B and connected with the chamber A by a through-hole bored in the compound piston portion 2a. The hollow and hole form together a through conduit connecting the chambers A, B and affording overflow of the braking fluid from one chamber to the other.

The flow of liquid (oil) through this conduit is controlled by a valve comprising a cup-shaped body 11 accommodated by the inner hollow in the compound piston through the interposition of a valve-holder 12 likewise of cup-shape, facing by its bottom the plug 4. The seat cooperating with the valve body 11 comprises a ring 13 of resilient material arranged in an annular recess formed in the bottom 14 of the inner hollow of the compound piston and retained by the adjacent end of the valve holder 12. Near the ring 13 the valve body 11 is smaller in outer diameter than the bore of the valve-holder 12 and has radial holes 11a bored therein adapted to connect the inside of the valve-holder with the inside of the valve body 11. Moreover, the valve-holder 12 is bored at its bottom thereby connecting the inside of the valve body 11 with the high pressure chamber B by the through-hole 10a in the disc 10. In the axial bore provided in the compound piston portion 2a a push-rod 15 is movable and an axial hole 15a bored therethrough. The push-rod bears at one end on the bottom of a radial groove 34 cut in the face of the plug 3 in contact of the compound piston portion 2a, and at its other end on the bottom of the valve body 11. 113 denotes a reaction spring interposed between the bottoms of the valve body 11 and valve-holder 12, the said spring biassing the valve body 11 towards its seat formed by the ring 13. Since the push-rod is longer than the through-bore in the compound piston portion 2a summed with the depth of the groove 3d, the valve comprising the valve body 11 and seat 13 is opened by the push-rod when the compound piston is in its position shown in FIGURE 2. The oil can then freely flow from the chamber A through the groove 3b and hole 15a in the push-rod 15, radial holes 11a, inner hollow in the body 11, hole in the bottom of the valve-holder 12 and through-hole in the disc 10 to the chamber B.

The reaction spring is mounted in a pre-stressed condition in the chamber B and is especially designed in respect of its initial load and flexibility as explained hereafter.

An annular chamber C is interposed between the portions 2a, 2b of the compound piston and connects with the outside through a vent 100 bored in the wall of the cylinder 1 covered by a ring 16 of resilient material adapted to prevent access of water or dust to the chamber C.

The above described booster operates as follows. Oil is initially free to flow from the master cylinder through the holes 3b and 3c in the plug 3, chamber 3, groove 3d and through-conduit 15a in the push-rod 15, radial holes 11a, inner hollow in the valve body 11, hole bored in the bottom of the valve-holder 12, bore 10a in the disc 10, chamber B and holes 4a, 4b, respectively, to the fore and rear wheel brake cylinders, respectively, in order to effect approach of the jaws to the drums. As the pressure reaches a certain value, the compound piston is withdrawn from the plug 3, the valve 11, 14 closing and intercepting communication between the chambers A, B. On further rise in pressure the compound piston moves further in order to make up for any resilient yielding of the pipes and brake drums, the pressure in the chamber B and circuits leading to the wheel brake cylinders increasing with respect to the pressure in the chamber A and delivery circuit of the master cylinder.

As the brake pedal P (FIGURE 1) is released and the pressure in the chamber A sinks, the compound piston recedes under the action of the high pressure in the chamber B and thrust of the reaction spring 5, the valve opening under the thrust of the push-rod 15 which bears on the projection 3a on the plug 3. The oil then freely flows from the circuit of the wheel brake cylinders to the delivery circuit of the master cylinder and the brake jaws can be withdrawn from their respective drums.

It will be clear from the above that the oil initially freely flows through the booster to the wheel brake cylinders, the oil volume required from the master cylinder for effecting approach not being larger than in conventional hydraulic brake systems. Only after the jaws have come into contact with the drums and pressure has reached its predetermined value, the compound piston starts movement to effect the compression stroke. The corresponding compression stroke of the master piston in the master cylinder, the operating pressure being the same, is necessarily longer than in a conventional hydraulic brake system deprived of the improved hydraulic brake booster. However, the pressure in the master cylinder, hence the required stress on the brake pedal is accordingly smaller. In other words, if the rise in pressure afforded by the booster amounts to 50%, the compression stroke of the piston in the master cylinder is lengthened by 50%, while the pressure in the master cylinder is reduced by 50%.

As mentioned above, the reaction spring should possess special characteristics in respect of initial load and stiffness.

It will already now be obvious that the initial load of the spring should be such as to allow movement of the compound piston only after the pressure has reached its required value for moving the jaws against the drums against the bias of the return springs (approach pressure).

Otherwise, approach would be effected by a displacement of the compound piston and the corresponding piston stroke in the master cylinder would be accordingly lengthened.

In practice the intervention pressure of the compound piston should be about twice the necessary approach pressure in order to insure full contact of the jaws and drums as the compound piston starts its compression stroke. Even thus it may happen that on rapidly applying the brakes, the compound piston starts movement during the approach stroke giving nevertheless rise to a lengthening of the piston stroke in the master cylinder.

This drawback is due to the fact that on rapid approach the oil flow through the connections, rigid and flexible pipings results in a drop of pressure between the booster and wheel brake cylinders. Under these conditions the pressure in the booster exceeds the intervention pressure, the movement of the compound piston starting before completion of the approach stroke. During the full period of this stroke the necessary oil volume for approach is supplied in part directly by the oil flowing from the master cylinder through the valve 11, 14 and by the displacement of the compound piston, respectively.

The latter displacement should be minimized, for it is the cause of lengthening of the piston stroke in the master cylinder.

In order to determine the parameters governing the said displacement, the motion of the compound piston was investigated and upon suitable simplifications the following expression was reached, which determines the compound piston displacement:

$$S = (p_a + kQ - p_i)\frac{A_d}{R}\left[1 - e^{-\frac{R}{kA_d^2} \cdot T}\right]$$

wherein the meaning of the symbols is as follows:

$p_a$ = approach pressure
$p_i$ = intervention pressure of the booster
$Q$ = oil delivery (at the booster inlet)
$k$ = resistance coefficient of the hydraulic circuit between the booster and wheel brake cylinders
$T$ = period of the approach stroke
$A_d$ = difference in area of the cross-sections of the two composite piston portions
$R$ = stiffness of the reaction spring.

It will be seen from the above expression that, in order to reduce the compound piston stroke during approach of the jaws to the brake drums, the intervention pressure $p_i$ and ratio $R/A_d$ should be increased.

In order to determine the initial load, i.e. the intervention pressure $p_i$ and stiffness of the reaction spring, i.e. the $R/A_d$ ratio, it should be considered that increase in initial load delays intervention of the booster, while increase in stiffness reduces the pressure increment obtainable after closure of the valve 11, 14.

In actual practice it was found that, the intervention pressure equalling twice at least the approach pressure, the initial effective load of the reaction spring $R/A_d$ ranging between a minimum of 10 and a maximum of 20 kgs./cm.², the compound piston stroke during quick approach is reduced to an admissible value. As a general rule, all other conditions being the same, the factor of flexibility of the reaction spring $R/A_d$ should be proportional to the increment factor of the booster: the higher the increment factor, the lower the factor of flexibility of the reaction spring should be.

It should be moreover noted that, if the reaction spring be excessively flexible, the initial stroke of the compound piston required for closing the valve 11, 14 takes place without an appreciable increase in pressure in the circuit, which results in an unpleasant feeling of emptiness perceivable on the brake pedal.

In conventional brake systems on motor vehicles a booster was found satisfactory, in which the diameters of both compound piston portions amount to 31.75 and 25.4 mm. (1¼" and 1", respectively). Assuming the areas of the two compound piston portions amount to 7.91 sq. cm. and 5.06 sq. cm. ($A_d$=7.91—5.05=2.85 sq. cm.), the increment by the booster amounts to 56%. With an approach pressure $p_a$ of 5 kgs./sq. cm. an intervention pressure $p_i$ of 10 kgs./sq. cm. can be selected. The reaction spring should therefore be of an initial effective load of 28.5 kgs. and a stiffness not below 28.5 kgs./cm. With such a stiffness value, the ratio $R/A_d$ would equal 10. In practice a more satisfactory condition was determined by increasing the value of stiffness to 40 kgs./cm., corresponding to a $R/A_d$ ratio=14 kgs./cm. On raising the intervention pressure to 15 kgs./sq. cm. the initial load of the reaction spring should be 42.75 kgs., in which case the $R/A_d$ ratio could be reduced from 14 to 10, reducing the stiffness accordingly from 40 kgs./cm. to 28.5 kgs./cm. With a stiffness of the reaction spring of 40 kgs./cm., the working pressure would be reduced by about 8 kgs./sq. cm. to each cm. displacement of the compound piston with respect to the case of a spring of nil stiffness, while with a stiffness of 28.5 kgs./cm. the reduction would amount to about 5.6 kgs./sq. cm. per cm. With a booster as described above the only possible location of a spring of a suitable initial load and stiffness is in the high pressure chamber, no sufficient space being available in the annular chamber C between the two portions of the compound piston.

Considering the factors involved in the case of sharp braking, it will easily be understood that a satisfactory operation of the booster can be obtained without reaching inadmissible values of the intervention pressure or stiffness of the reaction spring by proceeding as follows:

(1) By a maximum increase of the cross-sectional areas of the oil passages in the circuit or circuits connecting the booster with the wheel brake cylinders, in order to minimize overpressure during approach.

(2) By throttling the oil flow in the circuit leading from the master cylinder to the booster, in order to limit the approach rate, considering, however, that excessive throttling should be avoided in order to avoid an excessive increase in the necessary load on the brake pedal for effecting approach.

(3) By delaying displacement of the compound piston during approach. This may be obtained by filling with oil the annular chamber C between the two portions 2a, 2b of the compound piston and throttling the passage between the said chamber and an oil reservoir, as shown in FIGURE 3. This construction necessitates interposing a valve in the passage between the annular chamber C and oil reservoir to effect rapid filling of the annular chamber C on release of the brake pedal. A construction of this kind is shown in FIGURE 3. The cylinder 1 of the booster is arranged beneath the master cylinder, both cylinders being cast integrally. The annular chamber C between the two compound piston portions is connected with the auxiliary reservoir D of the master cylinder.

In order to delay movement of the compound piston 2 during approach of the jaws to the brake drums, the connection is effected through a valve 33 which is normally held closed by a spring 34. The valve body has an axial orifice bored therethrough which throttles the oil flow from the chamber C to the reservoir D so that on quick approach the movement of the compound piston is slowed down. On release of the brake pedal the compound piston withdrawn by the pressure in the chamber D and by the reaction spring 5 can quickly move backward because the valve 33 automatically opens and oil can freely flow from the reservoir D to the annular chamber C. Further structural details and the operating principle of the booster construction shown in FIGURE 3 do not differ from those described with reference to the construction shown in FIGURE 2.

On the other hand, the booster construction shown in FIGURE 3 is described in detail in an Italian application filed April 22, 1959, Serial Number 6,257, of even date as the basic Italian priority application.

The diagram of FIGURE 4 shows the behaviour of the delivery pressure (pressure in the master cylinder) and of the working pressure (pressure in the wheel brake cylinders) depending upon the load on the brake pedal. In the diagram the lines 35, 36 show the variation in pressure in the master cylinder and the pressure in the wheel brake cylinders, respectively, the points 37, 38 denoting the end of the jaw approach to the brake drums and the moment at which the valve 11, 14 carried by the booster compound piston closes. The ordinates denote the value of the approach pressure and value of the pressure at which intervention of the booster starts.

It will be seen from this diagram that increment in working pressure starts when the pressure in the circuit reaches a predetermined value, after the approach stroke has been completed, whereupon increment gradually rises as the pressure in the master cylinder increases.

In the diagram shown in FIGURE 5, the line 39 shows the behaviour of the compound piston stroke $s$ (depending upon the approach period T at given values of $p_a$, $p_i$, $k$, Q, $A_d$ and R).

Though the invention has been described more particularly in connection with a hydraulic brake system on motor vehicles, it can obviously be usefully employed in hydraulic pressure transmission systems, in which the hydraulic pressure acting on a driving piston should be raised with respect to the pressure acting on a working piston after a predetermined pressure has been reached.

What I claim is:

1. In a hydraulic brake system having a master cylinder adapted to deliver liquid under pressure and wheel brake cylinders controlling brake jaws cooperating with respective brake drums, said cylinders being adapted to receive liquid under pressure, an improved hydraulic pressure booster intermediate said master and wheel cylinders comprising a cylinder having an inner hollow which includes a large diameter and a small diameter portion, the portions connecting at adjoining ends and being closed by end walls at their oppositely disposed ends, a compound piston mounted for movement in the cylinder hollow, said piston having a large diameter and a small diameter portion associated with the large diameter and a small diameter portions of the cylinder hollow, a reaction spring mounted in the small diameter portion axially biasing said compound piston toward the large diameter cylinder end, a stop adapted to prevent abutment of the large diameter compound piston portion with the cylinder end under the pressure of the reaction spring and thereby creating an intermediate low pressure chamber connected with the outlet from the master cylinder, a high pressure chamber intermediate the small cylinder end and the small end of the piston, said high pressure chamber being connected with conduits leading to the wheel brake cylinders, a through conduit in the compound piston body, a valve interposed in said conduit adapted to allow a continuous free liquid flow from the low pressure chamber to the high pressure chamber and intercept the flow in the reverse direction from a selected pressure value and upward in the high pressure chamber, and to allow said flow in the reverse direction upon drop in pressure, means for holding said valve open when the compound piston bears on the said stop and for closing it after displacement of the compound piston against the reaction spring thrust, said reaction spring being mounted within the cylinder at an initial load to resist without compression the thrust of the compound piston under the action of a liquid pressure from the master cylinder exceeding the pressure for actuating said brake cylinders, said reaction spring being of a stiffness as to require as a minimum an increment in the pressure acting on the compound piston of about 1 kilogram per square centimeter to compress the spring by 1 mm. before closure of the valve, whereby said piston remains operative under conditions of very rapid braking, the line pressure increasing progressively with the power stroke and with no appreciable lag in working pressure.

2. A booster as claimed in claim 1, characterized in that the initial effective load of the reaction spring is such that the pressure at which the valve controlling interconnection of the low and high pressure chambers closes is at least twice as high as the pressure required for approach of the brake jaws to their respective brake drums.

3. A booster as claimed in claim 1, characterized in that the small diameter portion of the cylinder hollow in which the reaction spring is mounted is the high pressure chamber.

4. A device as claimed in claim 1, characterized in that the $R/A_d$ (stiffness/difference in area of the cross-sections of the two piston portions) ratio of the reaction spring ranges between 10 and 20 kgs./cm.

5. A booster as claimed in claim 1, characterized by throttle means arranged between the outlet from the master cylinder and said intermediate low pressure chamber of the booster, said throttle means being such as to cause, the delivery being the same, a drop in pressure equalling at least the pressure drop in the conduits interposed between the booster and wheel brake cylinders.

6. A booster as claimed in claim 1, characterized in that the annular chamber between the large and small diameter portions of the compound piston is connected with a reservoir filled with liquid for slowing down the compound piston movement, a valve being provided in the connection between said chamber and said reservoir adapted to throttle the liquid flow between the said annular chamber and reservoir and to allow a substantially free liquid flow in a reverse direction.

7. A booster as claimed in claim 6, characterized in that the said annular chamber is connected with a portion of the master cylinder which is always in communication with the liquid reservoir associated with said master cylinder.

References Cited in the file of this patent

UNITED STATES PATENTS

| 2,191,716 | Hunt | Feb. 27, 1940 |
| 2,351,953 | Goepfrich | June 20, 1944 |

FOREIGN PATENTS

| 668,612 | Germany | Dec. 7, 1938 |
| 1,034,981 | France | Apr. 15, 1953 |